US 6,614,502 B2

(12) United States Patent
Shinohara et al.

(10) Patent No.: US 6,614,502 B2
(45) Date of Patent: Sep. 2, 2003

(54) REFLECTION TYPE LIQUID CRYSTAL DEVICE, MANUFACTURING METHOD THEREFOR, AND PROJECTION DISPLAY SYSTEM

(75) Inventors: Masami Shinohara, Shiga-ken (JP); Mitsuru Uda, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 09/824,674

(22) Filed: Apr. 4, 2001

(65) Prior Publication Data

US 2001/0030725 A1 Oct. 18, 2001

Related U.S. Application Data

(62) Division of application No. 09/256,292, filed on Feb. 24, 1999, now Pat. No. 6,292,246.

(30) Foreign Application Priority Data

Mar. 2, 1998 (JP) ............................................. 10-049870

(51) Int. Cl.[7] ........................... G02F 1/1335; G02F 1/13
(52) U.S. Cl. ...................................... 349/187; 349/113
(58) Field of Search ............................ 349/113, 187, 349/138, 119

(56) References Cited

U.S. PATENT DOCUMENTS 3,978,580 A    9/1976   Leupp et al.
5,521,731 A    5/1996   Fukuyama et al.
5,767,827 A    6/1998   Kobayashi et al.

FOREIGN PATENT DOCUMENTS

| EP | 0725303 A1 | 8/1996 |
| EP | 0751417 A1 | 1/1997 |
| EP | 0768710 A2 | 4/1997 |
| GB | 2066545 A | 7/1981 |
| JP | 7-209621 | 8/1995 |
| JP | 08179377 | 7/1996 |
| JP | 8-248425 | 9/1996 |
| JP | 8-328034 | 12/1996 |

*Primary Examiner*—Toan Ton
(74) *Attorney, Agent, or Firm*—Robert M. Trepp, Esq.; McGinn & Gibb, PLLC

(57) ABSTRACT

An active matrix reflective liquid crystal device includes an array substrate which includes switching elements corresponding to pixels and an array of pixel electrodes connected to the switching elements; and an opposing substrate which has a transparent electrode opposite the array of pixel electrodes with a liquid crystal layer inserted therebetween. Each of the pixel electrodes includes an array of electrode studs, (e.g., divided electrode elements). The regions between the electrodes are filled with an insulating material, and the surface of the stud array is planarized by chemical-mechanical polishing (CMP). A dielectric light reflective film is formed on the planarized surface of the stud array, and a liquid crystal molecule alignment film is deposited thereon. Thus, a reflection type liquid crystal device is provided having a planarized light reflective face for a reduced reflection loss, along with a method for manufacturing the same, and a projection display system using such a reflection type liquid crystal device.

3 Claims, 5 Drawing Sheets

Prior Art

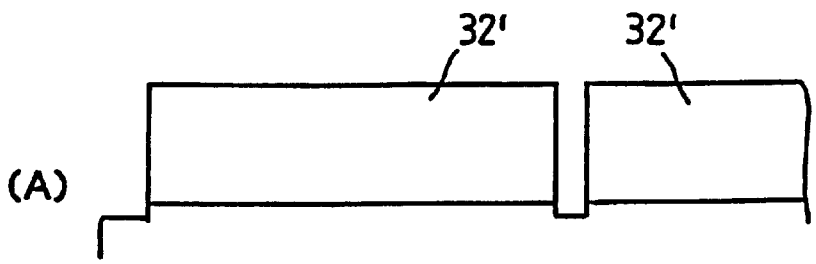
Fig. 6 (A)
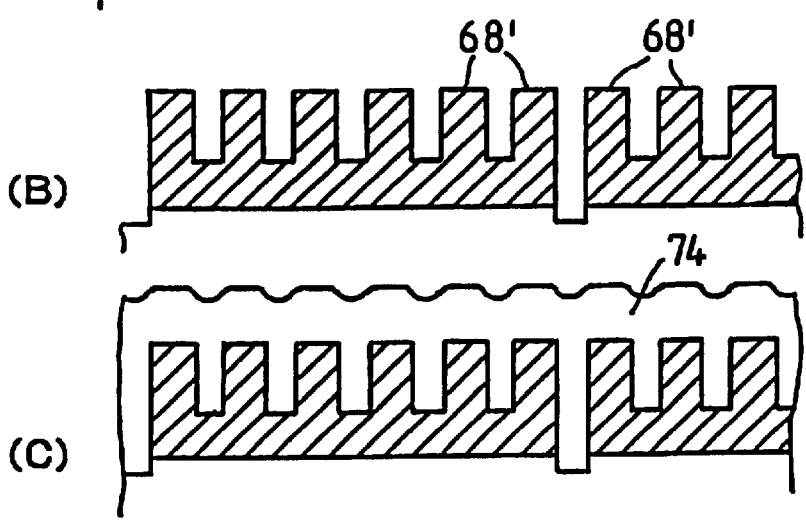
Fig. 6 (B)
Fig. 6 (C)
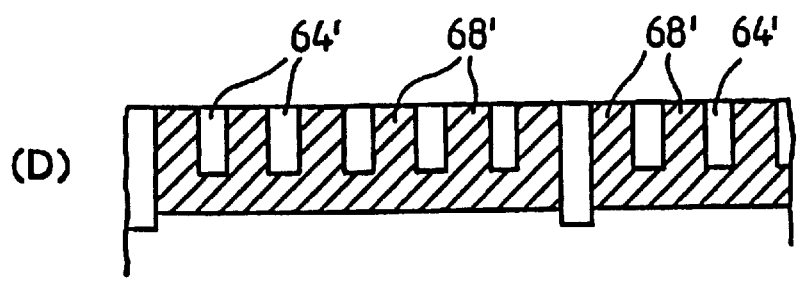
Fig. 6 (D)

REFLECTION TYPE LIQUID CRYSTAL DEVICE, MANUFACTURING METHOD THEREFOR, AND PROJECTION DISPLAY SYSTEM

The present Application is a Divisional Application of U.S. patent application Ser. 09/256,292, filed on Feb. 24, 1999.

BACKGROUND OF THE INVENTION

1. Field of the Invention

The present invention relates to a reflection type liquid crystal device suitable for use as a light valve or an optical modulation device for a projection display system and to a manufacturing method therefor, and to a projection display system employing such a liquid crystal device.

2. Description of the Related Art

Recently, a type of projection display that uses an active matrix type reflective liquid crystal device as a light valve or as an optical modulation device has been developed for use in a high image quality display. Such a projection display is disclosed, for example, in Japanese Unexamined Patent Publication (Patent Kokai) Nos. 08-248425, 07-209621 and 08-328034.

In a projection display using a reflective liquid crystal device, light emitted by a light source is separated into the three primary colors: red, blue and green. The light elements of the respective colors are transmitted to corresponding reflective liquid crystal devices where they are optically modulated. The colored light elements reflected by the liquid crystal devices are recombined and the resultant light is magnified by an optical lens system and is projected onto a screen to thereby display a color image.

An active matrix type reflective liquid crystal device has an array substrate and an opposing substrate disposed opposite the array substrate at a predetermined space. The array substrate includes switching elements which are field-effect transistors (FETs), provided in a matrix correspondingly to pixels, pixel electrodes connected to the switching elements and arranged as a matrix, and storage capacitors connected to the pixel electrodes for holding the charge on the electrodes. A transparent electrode is provided on the opposing substrate. A liquid crystal layer is inserted into the space between the array substrate and the opposing substrate.

Light is incident on the side of the opposing substrate, and the liquid crystal selectively changes the polarization state of the incident light in response to a voltage applied to the pixel electrodes. The incident light is reflected by the pixel electrodes that also serve as light reflectors, the reflected light passing through the transparent electrode and emerging from the liquid crystal device.

FIGS. 1 and 2 show a conventional active matrix type reflective liquid crystal device that is similar to that shown in FIGS. 1 and 2 of the above-mentioned Japanese Unexamined Patent Publication (Patent Kokai) No. 08-248425.

The array substrate includes a silicon substrate 1, on which field-effect transistors (FETs), are provided in a plurality of regions defined by field oxide isolation regions 12. The FETs, which are provided correspondingly to pixels, each include a gate insulating film 2 made, for example, of silicon dioxide, a gate electrode 4 made, for example, of polysilicon, a drain region 6, a source region 8, and a channel region 10 extending between the drain 6 and the source 8.

A storage capacitor 16 for holding a charge is formed on silicon dioxide film 14. The storage capacitor 16 includes two polysilicon layers that serve as capacitor electrodes and a dielectric layer made of silicon dioxide film that is sandwiched between the polysilicon layers. A silicon dioxide film 18 is formed to cover the silicon dioxide film 14 and the capacitor 16. A drain electrode 20 and a source electrode 22 made, for example, of aluminum are formed in openings in the silicon dioxide films 14 and 18. The drain electrode 20 is connected to a data line 21 that extends perpendicular to the drawing in FIG. 1, and the gate electrode 4 is connected to a gate line 5 (see FIG. 2) that is orthogonal to the data line 21.

The source electrode 22 has an extension 23 which extends on the silicon dioxide film 18 to overlap the capacitor 16. The upper capacitor electrode is connected to the source electrode extension 23 by a via 19, made, for example, of tungsten, that passes through the silicon dioxide film 18.

A silicon dioxide film 24 is deposited on the drain electrode 20 and the source electrode 22, and a light absorption layer 26 is formed thereon. The light absorption layer 26 is a composite layer including, for example, a titanium underlayer, an intermediate aluminum layer and a titanium nitride upper layer, and prevents undesirable light reflection and light transmission to the FETs.

A through hole is formed in the light absorption layer 26 to permit the passage of a via 30. A silicon nitride film 28 that is substantially about 4000 Å to about 5000 Å thick is formed on the light absorption layer 26. Pixel electrodes 32 made of aluminum and having a thickness of 1500 Å are formed on the film 28 at a space or gap of approximately 1 μm. The pixel electrodes 32 are also used as light reflectors (reflection mirrors), and the array of the pixel electrodes 32 forms a light reflective plane.

The via 30, made of tungsten, is formed so that it passes through the silicon dioxide film 24, the light absorption layer 26 and the silicon nitride film 28. The FET source electrode 22 and the pixel electrode 32 are connected to each other by the via 30. A liquid crystal molecule alignment film 33 is formed on the array of the pixel electrodes 32.

As shown in FIG. 2, the pixel electrodes 32 are arranged as a matrix to correspond to the individual pixels. Spacers 34, which are shaped like pillars about 2 to 3 μm tall and are made, for example, of silicon dioxide, are provided at selected positions between the pixel electrodes 32.

Disposed on the pillar-shaped spacers 34 is an opposing substrate comprising a glass substrate 40 on which is located a transparent opposing electrode or common electrode 38 coated with a liquid crystal molecule alignment film 37. The transparent electrode is made, for example, of ITO (indium tin oxide). A liquid crystal layer 36 is inserted between the array substrate and the opposing substrate.

The aluminum pixel electrodes 32 are formed by depositing aluminum on the entire surface of the silicon dioxide film 28, and by etching the aluminum layer using a photolithographic process. Then, a liquid crystal molecule alignment film, such as polyimide film, is formed to cover the array of the pixel electrodes 32, and rubbing (e.g., polishing) of the alignment film is performed.

FIG. 3 is an enlarged cross-sectional view of portion A enclosed by the circle shown in FIG. 2. As shown in FIG. 3, a height difference (e.g., a groove) exists between the pixel electrodes 32. Since silicon nitride film is not fully resistant to RIE (Reactive Ion Etching), which is used for aluminum etching, the silicon nitride film is also more or less etched during the aluminum etching.

As a result, a groove or a height difference equal to the sum of the thickness of the pixel electrode 32 and the depth of the cut in the etched silicon nitride film is formed in the area between the pixel electrodes 32.

In the above-described conventional structure, there are several problems.

First, light incident on the edges of the pixel electrodes is scattered. The scattered light does not effectively act as light that constitutes a pixel, and causes a loss in reflected light.

In addition, the regions between the pixel electrodes do not act as an effective light reflector. When adjacent pixel electrodes are driven simultaneously, an electric field similar to that applied across the liquid crystal on the pixel electrodes is also applied across the liquid crystal between the pixel electrodes, and the liquid crystal between the pixel electrodes behaves optically in a similar manner to the liquid crystal on the pixel electrodes.

That is, the liquid crystal regions on the adjacent pixel electrodes and the liquid crystal regions between the adjacent pixel electrodes behave as if they are continuous. Therefore, if the light reflector were continuous, the reflected light from the regions between the pixel electrodes could contribute to an increase in the light output. However, since the area between the pixel electrodes cannot act as an effective light reflector, the efficiency of light utilization is reduced.

Further, since the light reflective plane provided by the array of the pixel electrodes is not planar, the planarity of the alignment film deposited over the pixel electrodes is deteriorated. As a result, the alignment film is not evenly polished, which may cause poor liquid crystal alignment.

A possible method for resolving the above problems is to fill the gap regions between pixel electrodes with an insulating material, and planarize the surface by chemical-mechanical polishing (CMP) process. However, when the CMP process is used, the center portions of the relatively large pixel electrodes become recessed like a dish (e.g. "dishing"), and the reflectivity is reduced. Therefore, this is not a preferable method. Further, even if a dielectric light reflective film is formed to cover the array of the pixel electrodes, it is difficult to obtain a completely planar surface.

SUMMARY OF THE INVENTION

In view of the foregoing and other problems of the conventional systems and methods, an object of the present invention is to provide a reflection type liquid crystal device whose light reflective face is planar and does not include optical discontinuity and which causes less reflected light loss.

It is another object of the present invention to provide a method for manufacturing such a reflection type liquid crystal device.

It is an additional object of the present invention to provide a projection display system that employs such a reflection type liquid crystal device as a light valve.

In a first aspect of the invention a reflection type liquid crystal display according to the present invention is formed so that each pixel electrode includes an array of small electrode studs, i.e., an array of divided electrode elements. The studs have substantially uniform dimensions and are arranged on the pixel electrode at uniform spacing. The regions between the studs are filled with an insulating material so that the surface of the insulating material is substantially flush with the top surfaces of the studs. Chemical-mechanical polishing (CMP) process as used in a semiconductor damascene process is utilized to form the stud array having a substantially completely planar surface. A dielectric light reflective film is formed on the planar surface provided by the studs and the insulating material.

In other aspects, the present invention provides a method for forming such a reflection type liquid crystal device and a projection display system using such a reflection type liquid crystal device.

According to the present invention, the reflective film and the alignment film deposited thereon are substantially quite planar, and there is substantially no optical discontinuity between pixel electrodes. Therefore, the above-described light scattering at the edges of the pixel electrodes can be prevented, and the reflection of light from the regions between the pixel electrodes can be effectively used.

In addition, poor liquid crystal alignment due to uneven rubbing (polishing) can be prevented. As a result, the reflection efficiency and the quality of a displayed image can be enhanced.

Further, since the reflective film covers the entire surface, the light absorption layer may be omitted when the transmission of light through the reflective film is negligible.

BRIEF DESCRIPTION OF THE DRAWINGS

The foregoing and other purposes, aspects and advantages will be understood from the following detailed description of a preferred embodiment of the invention with reference to the drawings, in which:

FIGS. 6A–6D illustrate a process for manufacturing an alternative embodiment of the pixel electrodes.

DETAILED DESCRIPTION OF PREFERRED EMBODIMENTS OF THE INVENTION

Figure 1:
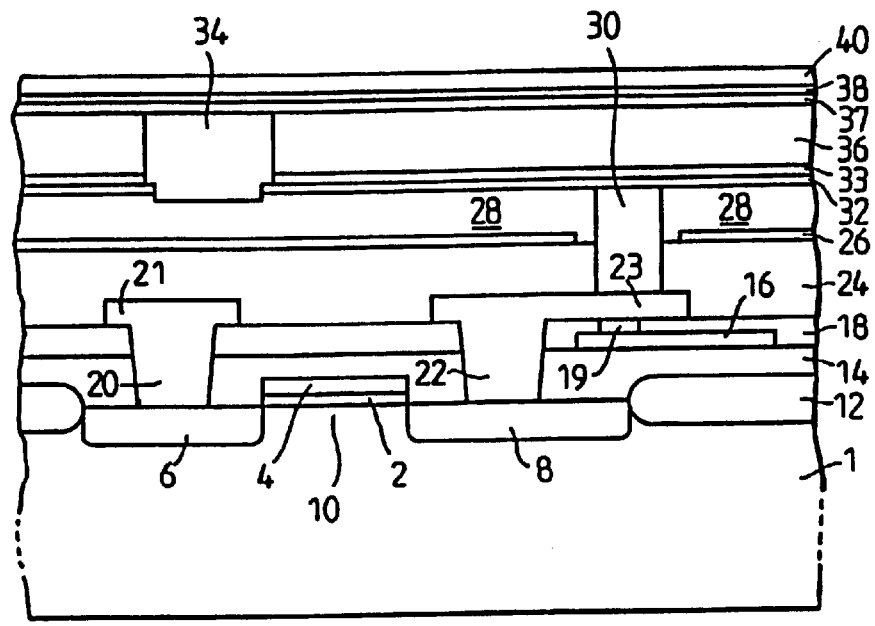
FIG. 1 is a cross-sectional view of a conventional reflection type liquid crystal device.

With reference to FIGS. 4 to 6D, a reflective liquid crystal device and a manufacturing method therefor will now be described. It should be noted that the components in the drawings are not shown to scale. A feature of the liquid crystal device of the present invention resides in the structure of the pixel electrodes. The structure of other portions of the device may be similar to that for the conventional liquid crystal device described with reference to FIG. 1.

Figure 4:
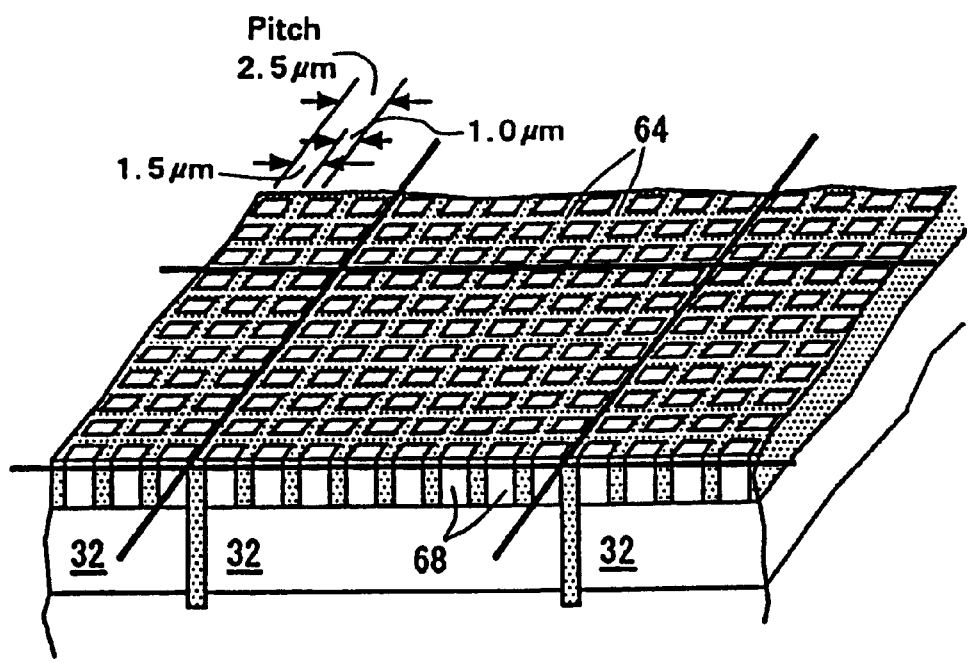
FIG. 4 is a diagram illustrating a structure of pixel electrodes according to the present invention.
Figure 5:
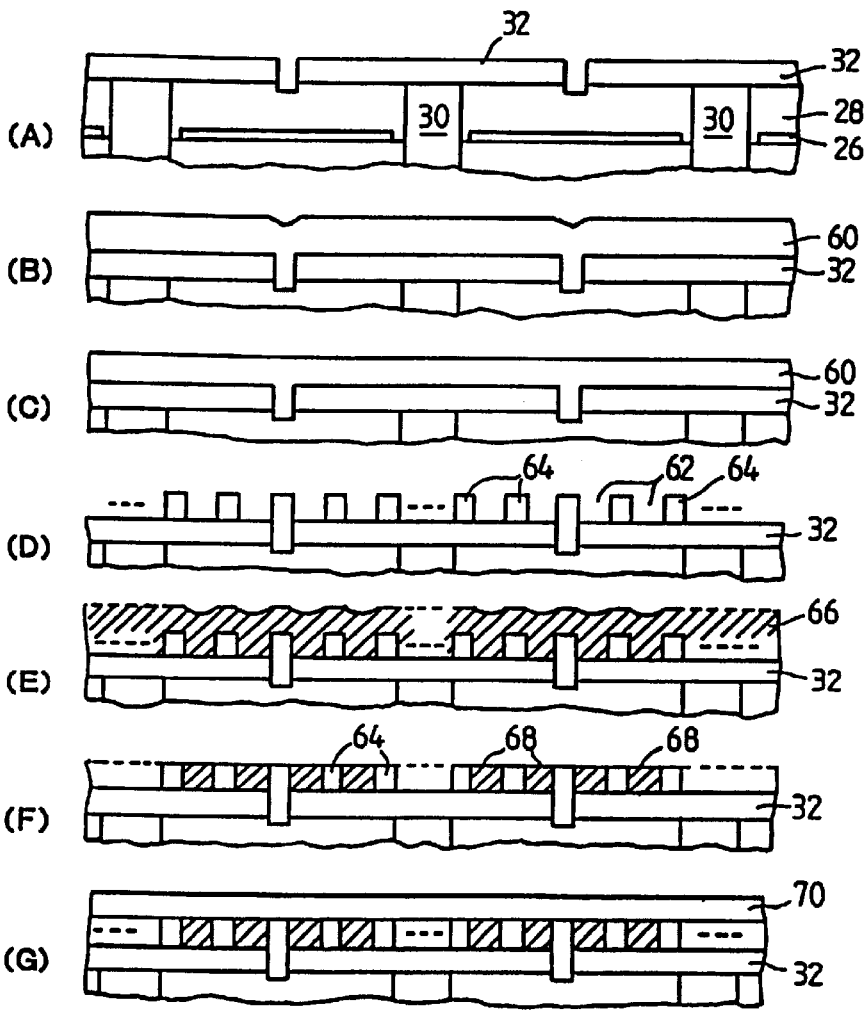
FIGS. 5A–5G illustrate a process for manufacturing pixel electrodes according to the present invention.

According to the present invention, as shown in FIG. 4, each of the pixel electrodes 32 is formed to have an array of small pillar-shaped electrode studs, i.e., divided electrode elements 68. In this example, the studs 68 of each pixel electrode are arranged in an 8×8 array. The studs 68, all of which have substantially uniform dimensions or size, are located at substantially uniform spacing.

In this example, 20 $\mu$m×20 $\mu$m pixel electrodes 32 are arranged at spaces of about 0.8 $\mu$m. In this case, for example, the top surface of each of the studs 68 is about 1.5 $\mu$m×1.5 $\mu$m and its height is about 0.6 $\mu$m, and the space between the studs 68 is about 1.0 µm. For example, the pixel electrodes 32 are made of aluminum and the electrode studs 68 are made of tungsten, and the regions between the studs 68 are filled with silicon dioxide 64. The surfaces of the studs 68 and the silicon dioxide 64 are planarized by CMP.

FIGS. 5A–5G show a process according to the present invention for forming an array of metal electrode studs 68 on each of the pixel electrodes 32.

In FIG. 5(A), a light absorption layer 26, a silicon nitride layer 28 and interconnecting studs 30 correspond to those in FIG. 1. The process steps to the point where the pixel electrodes 32 are formed are similar to those in the conventional process. The pixel electrodes 32 are made, for example, of aluminum about 1500 Å thick.

After an aluminum layer is deposited and etched by RIE to form an array of the pixel electrodes 32, a silicon dioxide layer 60 is deposited on the pixel electrodes 32 by a CVD process, as shown in FIG. 5(B). The silicon dioxide layer 60 is deposited so that it completely fills the grooves or recessed portions between the pixel electrodes 32 and so that the thickness of portions above the surface level of the pixel electrodes 32, (i.e., the thickness as measured from the surface level of the pixel electrodes) is equal to or greater than a desired height for the studs 68.

Then, as shown in FIG. 5(C), the silicon dioxide layer 60 is planarized by CMP so that the thickness of the portions above the surface level of the pixel electrodes 32 substantially equals the desired height for the studs 68. CMP can be performed by using a basic polishing slurry including silica particles and a potassium hydroxide solution (a pH of approximately 11 to 11.5).

Then, as shown in FIG. 5(D), an array of openings 62 is formed in the silicon dioxide layer 60 by photolithographic masking and RIE etching. The openings 62 are provided at positions where the studs 68 are to be formed. Other than the portions at the openings 62, the silicon dioxide layer 64 is not removed.

Next, as shown in FIG. 5(E), a tungsten layer 66 that is thick enough to fill the openings 62 is deposited by a CVD process. In this case, preferably an underlayer of titanium (Ti), a barrier layer of titanium nitride (TiN) and the tungsten layer 66 are formed in this order. The thickness of the underlayer is, for example, about 1600 Å, the thickness of the barrier layer is about 40 Å, and the thickness of the tungsten layer 66 is about 1.1 µm. The underlayer provides an improved adhesion to the silicon dioxide layer 64, and forms ohmic contact to the aluminum layer 32. The barrier layer protects the titanium and the aluminum layers from WF6 (a material gas) and HF (a generated gas) while the CVD process is being performed to deposit the tungsten layer 66, and provides enhanced adhesion to the tungsten layer 66.

Then, as shown in FIG. 5(F), the tungsten layer 66 is planarized by CMP. As a result, an array of the studs 68 is formed that is connected to the pixel electrodes 32 and that has a surface flush with the surface of the silicon dioxide layer 64. Acid polishing slurry that contains alumina particles and ferric nitrate solution (a pH of approximately 3 to 4), for example, can be used for the CMP of tungsten. The regions between the studs 68 are substantially completely filled with silicon dioxide 64.

The height of the studs 68 may be arbitrary so long as a substantially planar surface can be obtained, and may be about 0.3 to 2 µm. In this example, the height of the studs 68 is about 0.6 µm. As the number of the studs is reduced, the distribution of electric fields across the liquid crystal on the pixel electrodes tends to become uneven. As the area of the top surfaces of studs 68 grows larger and the number of the studs 68 is increased, dents (dishing) tend to occur in the top surfaces of the studs 68 during CMP. Generally, it is preferable that the area of the top surface of a stud 68 be equal to or smaller than about 4 µm²(2.0 µm×2.0 µm), and that a stud density given by a ratio of the sum of the areas of the top surfaces of the studs for one pixel electrode to the area of the top surface of the pixel electrode is about 50% or less.

Thereafter, as shown in FIG. 5(G), a dielectric light reflective film 70 is formed on the planarized stud array. Any well known material can be used for the dielectric reflective film 70. In this example, a silicon dioxide layer (a refractive index of 1.465) and a silicon nitride layer (a refractive index of 1.983) are alternately laminated to form a six-layer reflective film. The thickness of the first layer of silicon dioxide is about 80.25 Å, the thickness of the second layer of silicon nitride is about 64.62 Å, the thickness of the third layer of silicon dioxide is about 94.73 Å, the thickness of the fourth layer of silicon nitride is about 61.74 Å, the thickness of the fifth layer of silicon dioxide is about 20.63 Å, and the thickness of the sixth layer of silicon nitride is about 32.66 Å. The thicknesses of these layers are based on theoretical values. In actuality, during the manufacturing process, thickness errors may occur within a range of several percent but an adequate reflection function still can be provided.

Then, a liquid crystal molecule alignment layer (not shown), such as a polyimide layer, is formed on the dielectric light reflective film 70 according to well known processes, and rubbing (polishing) for liquid crystal molecule alignment is performed.

FIGS. 6A–6D show an alternative method for forming an array of studs on the pixel electrode. In this example, etching is used to form electrode studs that are integrally formed with the pixel electrode. Aluminum, for example, is used to make thick pixel electrodes 32', as shown in FIG. 6(A).

To form studs 68' as shown in FIG. 6(B), the pixel electrodes 32' are etched using photolithographic masking and RIE etching until the cuts reach a depth corresponding to the height specified for studs 68'.

Then, in step 6(C) a CVD process is used to deposit a silicon dioxide layer 74 on the pixel electrodes 32' that completely fills the regions between the pixel electrodes and between the studs. Finally, in step 6(D) the silicon dioxide layer 74 is polished by CMP and planarized by using a basic polishing slurry including silica particles and a potassium hydroxide solution (a pH of approximately 11 to 11.5). In this fashion, a stud array with a planarized top surface can be obtained in which regions between the studs 68' are filled with a silicon dioxide 64' with its top surface being flush with the top surfaces of the studs 68'.

An explanation and illustration have been given in FIGS. 5A–5G for the liquid crystal device that includes the light absorption layer 26. According to the present invention, however, the dielectric light reflective film 70 covers the entire surface. Thus, if light transmission through the reflective layer 70 is of negligible order, then the light absorption layer 26 can be eliminated, and the manufacturing process and the structure can be simplified.

Figure 7:
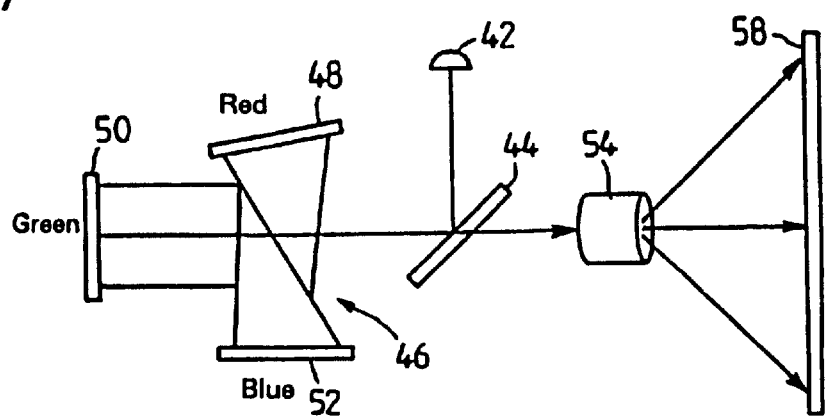
FIG. 7 is a diagram illustrating an arrangement of a projection display system using the reflective liquid crystal device according to the present invention.
Figure 2:
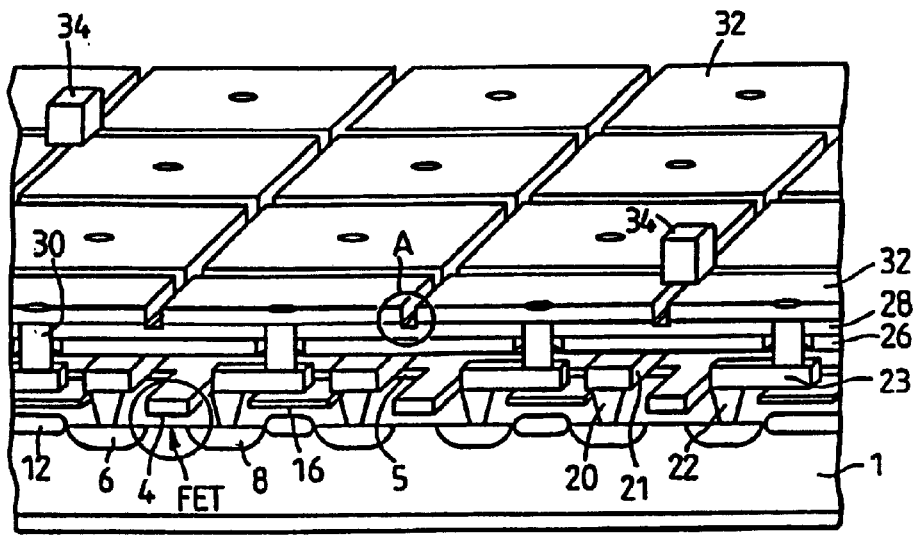
FIG. 2 is a diagram showing the structure of the conventional reflection type liquid crystal device.
Figure 3:
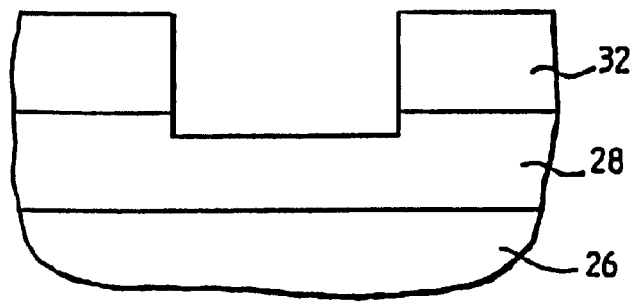
FIG. 3 is an enlarged diagram of portion A enclosed by a circle in FIG. 2.

FIG. 7 shows a projection display system that uses the reflection type liquid crystal device according to the present invention as a light valve or as a light modulation device.

As shown, linearly polarized light emitted from a light source 42 is reflected by a polarization beam splitter 44 and is transmitted to a dichroic prism 46. The beam splitter 44 transmits or reflects incoming light in accordance with its polarization direction.

The light is separated by the prism 46 into the three primary colors: red, blue and green. The colored light elements are guided to corresponding reflective liquid crystal devices 48, 50 and 52, which selectively perform light modulation and rotate the polarization directions of the respective light elements. The liquid crystal, for example, is a birefringent TN liquid crystal having a twist angle of about 45°. The polarization direction is rotated up to 90° depending upon a voltage across the liquid crystal. The three light elements from the liquid crystal devices are recombined by the dichroic prism 46, and the obtained light is input to the polarizing beam splitter 44. The light is transmitted through the polarizing beam splitter 44 in accordance with rotational angle, and is projected in enlarged form onto a screen 58 by a projection lens system 54.

In FIG. 7, the dichroic prism 46 is employed as means for separating light into three primary colors and for recombining the separated light elements. However, obviously the dichroic prism 46 could be replaced by other well known means, such as dichroic mirrors.

While the invention has been described in terms of several preferred embodiments, those skilled in the art will recognize that the invention can be practiced with modification within the spirit and scope of the appended claims.

For example, while aluminum is used for pixel electrodes in the above embodiments, other metals, such as copper or tungsten, could be used.

Further, while tungsten is used for the studs in the embodiment shown in FIGS. 4 and 5A–5G, other metals, such as copper, could also be used. Furthermore, the present invention will be applicable to any reflective liquid crystal device with a light reflection member built therein.

What is claimed is:

1. A method for manufacturing a reflection type liquid crystal device, comprising:

forming an array of pixel electrodes on a substrate which includes transistors formed correspondingly to pixels, said pixel electrodes being connected to corresponding transistors;

forming, on said array of said pixel electrodes, an insulating layer having a planar top surface;

forming, in said insulating layer on said pixel electrodes, an array of openings having substantially uniform dimensions and being provided at substantially uniform spacing, said openings exposing surfaces of said pixel electrodes;

depositing a metal layer on said insulating layer to completely fill said openings;

chemical-mechanically polishing said metal layer to form, in said openings, electrode studs which are substantially planar with said insulating layer; and depositing a dielectric light reflection film on said insulating layer and oil said electrode studs.

2. The manufacturing method according to claim 1, wherein said forming of said insulating layer having a planar top surface includes:

forming an insulating layer on said array of pixel electrodes so that the thickness of said insulating layer as measured from the surface level of said pixel electrodes is equal to or greater than the height of said studs; and planarizing said insulating layer by chemical-mechanically polishing said insulating layer to a thickness substantially corresponding to the height of said studs.

3. A method for manufacturing a reflection type liquid crystal device, comprising:

forming an array of pixel electrodes on a substrate which includes transistors formed correspondingly to pixels, said pixel electrodes being connected to corresponding transistors;

etching said pixel electrodes to a predetermined depth that is less than a thickness of said pixel electrodes so as to form an array of electrode studs having substantially uniform dimensions and being arranged at substantially uniform spacing;

filling regions between said studs with an insulating material until the upper surface of said insulating material is higher than top surfaces of said studs;

chemical-mechanically polishing said insulating material so that the surface of said insulating material is substantially flush with said top surfaces of said studs, thereby providing a planar surface; and depositing a dielectric light reflection film on the planar surface.

* * * * *